United States Patent [19]

Bareuter et al.

[11] Patent Number: 5,393,361
[45] Date of Patent: Feb. 28, 1995

[54] MANUFACTURE OF POLYMERIC FOAM

[75] Inventors: Gerd Bareuter, Bamberger, Germany; Carlos Fernandez, Madrid, Spain; Jack Tetlow, Manchester, Great Britain

[73] Assignee: Unifoam A.G., Glarus, Switzerland

[21] Appl. No.: 834,532

[22] PCT Filed: Jun. 21, 1991

[86] PCT No.: PCT/EP91/01166
§ 371 Date: Feb. 11, 1992
§ 102(e) Date: Feb. 11, 1992

[87] PCT Pub. No.: WO92/00184
PCT Pub. Date: Jan. 9, 1992

[30] Foreign Application Priority Data

Jun. 27, 1990 [GB] Great Britain ............... 90143331

[51] Int. Cl.⁶ .................. B29C 67/22; B32B 31/14
[52] U.S. Cl. ............................. 156/78; 156/344; 264/45.8; 264/46.2
[58] Field of Search .................. 156/77–79, 156/344; 264/46.2, DIG. 84, 45–48; 425/817 C

[56] References Cited

U.S. PATENT DOCUMENTS

| | | | |
|---|---|---|---|
| 3,435,102 | 3/1969 | Sullhofer | 264/46.2 |
| 3,786,122 | 1/1974 | Berg | 264/46.2 |
| 3,880,559 | 4/1975 | Peille | 264/46.2 |
| 4,093,109 | 6/1978 | Schrader | 264/DIG. 84 |
| 4,097,210 | 6/1978 | Romanillos | 264/DIG. 84 |
| 4,150,075 | 4/1979 | Schmitzer | 264/46.2 |
| 4,222,722 | 9/1980 | Bokelmann | 264/DIG. 84 |
| 4,347,281 | 8/1982 | Futcher | 264/46.2 |
| 4,348,164 | 9/1982 | Fujii | 264/46.2 |
| 4,492,664 | 1/1985 | Bruno | 264/46.2 |
| 4,648,922 | 3/1987 | Marks | 264/46.2 |

FOREIGN PATENT DOCUMENTS

| | | |
|---|---|---|
| 0000058 | 12/1978 | European Pat. Off. . |
| 1190554 | 2/1988 | Italy . |
| 0224928 | 9/1988 | Japan . |

OTHER PUBLICATIONS

Webster's II New Riverside Dictionary, 1984.

Primary Examiner—Michael W. Ball
Assistant Examiner—Daniel J. Stemmer
Attorney, Agent, or Firm—Watson, Cole, Grindle & Watson

[57] ABSTRACT

In the production of slabstock polymeric foam, foam reactants are delivered to a vessel (1), the reacting foam mixture passes over an overflow outlet (2) from the vessel and along a downwardly inclined fall plate (3) to a conveyor (4), two separate covering layers, namely a lower flaccid plastics film (26) and an upper relatively stiff paper foil (28), are applied over the reacting foam mixture near the overflow outlet (36), a blanket (40) weighted by free floating plates (46) is positioned over the cover layers in the foam expansion zone to press down lightly on the foam. The separate plastics film and paper foil are provided by delaminating a composite sheet (21), and are delivered to the foam surface in substantially tension-free condition by a take-off mechanism (22) which draws the composite sheet from a supply roll. Improved economy is achieved as a result of improved characteristics at the top of the foam block produced.

6 Claims, 3 Drawing Sheets

MANUFACTURE OF POLYMERIC FOAM

BACKGROUND OF THE INVENTION

This invention relates to an improved method of manufacturing slabstock polymeric foam, especially but not exclusively polyurethane foam, and the invention also relates to an apparatus for use in the production of foam blocks by the improved method.

It is well known and common current practice to make polyurethane foam blocks by a continuous process involving the essential steps of laying down a mixture of foam reactants onto the bottom of a channel-shaped conveyor, which serves as a moulding trough of open-topped rectangular cross-section, allowing the mixture to foam and expand as it progresses along the channel-shaped conveyor, and when the expanded foam has cured, cutting the slabstock foam into blocks. It is usual for the bottom and sides of the conveyor to be lined with foils of paper and/or plastics which advance with the foam and prevent it from sticking to the conveyor walls. When the foam expands, the resulting foam bun tends to take on a crowned or domed shape at the top, as seen in cross-section. At least in part, this crowning effect is caused by the expansion of the foam being resisted by the foam being in frictional contact with the lining foils or walls at the sides of the conveyor. The convex shape at the top of the foam bun is highly undesirable since it reduces the useful volume of foam obtained and hence detracts from the economy of the manufacturing process.

Various proposals have been made for preventing the formation of the crowned top. For example, it has been suggested to raise the foils lining the side walls during the expansion in attempt to eliminate the frictional resistance. Another idea is to apply a top cover sheet, e.g. of paper, to the upper surface of the foam mixture soon after it is laid down on the conveyor, and as the foam rises, pressure is applied to the top surface through the top cover sheet to constrain the expanding foam and achieve a flat top transverse to the direction of conveyor movement. In GB 1487848 (Planiblock) for instance there is described an apparatus in which a series of rollers or runners (plates) carried on pivoted arms are arranged to bear down on the expanding foam. According to another proposal described in GB 1392859 (Hennecke), a levelling device in the form of a slatted grating or grid is arranged to float on the expanding foam mixture. The Hennecke system has been used commercially and has enjoyed a certain degree of commercial success. Applying the top cover sheet has an additional benefit in that it reduces the tendency for the foam to form a skin on the top surface due to the foam collapsing at this surface. However, this benefit is counteracted to some extent by the application of substantial pressure to the top surface by the weight of the levelling device, and as a consequence the foam has to rise against this pressure, and a skin of significant thickness is still produced in practice. A further drawback of applying substantial pressure to the top surface during foam expansion is that it can increase the variation in density over the height of the foam block, and especially in the upper layers, which means that some of the foam can fall outside specification requirements.

Another technique which has proved very successful in producing flat-topped foam slabs is described in GB 1354341 (Unifoam). According to this technique the foam reactants are delivered into a vessel or trough which extends transversely to the direction of conveyor advancement and which has an overflow outlet over which the mixture spills onto a downwardly inclined ramp or fall plate extending to the conveyor itself. The fall plate angle is adjusted so that, in essence, the foam expands downwardly and the top surface is maintained substantially level throughout the foam expansion process. This process is exploited commercially under the name "Maxfoam" and has been in successful operation for several years. The Maxfoam process is very effective in producing flat-topped blocks, whereby the conversion of the blocks is very economic. Nonetheless, it does have one drawback which hitherto has proved insurmountable. The problem is that there is a relatively thick skin formed on the top surface of the foam. The disadvantages of a thick skin are several fold. As much as approximately 10% by weight of the foam bun material can be in the skin layers which must be cut away from the usable foam, and of this figure typically around 4–5% by weight can be in the top skin. If the skin thickness could be reduced, it would mean a saving in raw materials consumed and a greater percentage of material would be converted into useful foam, and hence the economy of the process would be enhanced. It is usual for the skin layers to be sold by foam manufacturers as a lower grade material which, for example, can be chopped or granulated into small pieces and rebonded together to form certain foam products such as carpet underlay. If the skin is too thick, however, it is not even acceptable for such processing and it must be discarded or burnt, which is obviously uneconomic as well as being undesirable from an environmental viewpoint. The reason that a relatively thick top skin is formed in the Maxfoam process is due to the foam collapsing at the upper surface and the reaction between toluene diisocyanate (TDI) which is one of the raw materials used in the foaming process, and the atmospheric moisture.

It has long been recognised and appreciated that the skin thickness would be diminished if a top cover sheet could be applied over the surface of the foam mixture during its expansion to define a moulding surface to which the foam would adhere by interfacial surface tension to reduce the tendency for the foam to collapse back on itself. This phenomenon is well known from polyurethane foam moulding techniques in which complete articles, e.g., cushions are formed within closed moulds. In spite of many attempts, prior to the present invention it has proved beyond skilled workers to apply successfully a top cover sheet over the reacting foam mixture in the Maxfoam process. The reason the attempts have failed is explained as follows. The foam reactants are delivered into and start to react with an open-topped vessel from which they pass via an overflow outlet into a channel extending over the fall plate to the conveyor. As seen across the width of the channel, there is a significant variation in the speed at which the reacting foam mixture flows along the channel from the vessel outlet to the conveyor. More precisely, the speed at the centre is substantially greater than that at the lateral sides of the channel. A top sheet of paper, as conventionally used in other types of foam production plants, applied over the reacting foam mixture leaving the vessel, is unable to conform to and move with the foam over the width of the channel along which the foam and paper advance, and this has the consequence that the paper creases and creates cracks and crevices in the underlying foam. The damage thus caused to the resultant foam bun means that less usable foam is obtained compared with the Maxfoam process operated without any covering sheet applied over the foam.

The objective of the present invention was to find a solution to the problem which is outlined above and which had previously thwarted others who had addressed it in the past.

SUMMARY OF THE INVENTION

In accordance with the present invention there is provided a process for the production of slabstock polymeric foam wherein foam reactants are delivered into a vessel, the reacting foam mixture passes from the vessel over an overflow outlet and to a channel-shaped conveyor, there being a downwardly inclined surface extending from the overflow outlet in the foam conveying direction, and wherein the upper surface of the foaming mixture is covered by two separate sheets applied in the vicinity of the overflow outlet of the vessel, the lower sheet which contacts the foam being a flaccid film of plastics material adapted to conform to the foam surface and the upper sheet being a relatively stiff foil.

The use of the composite covering material comprising two separate layers, and in particular a first layer of flaccid film, e.g. polyethylene, means that this film which contacts the foam is able to wrinkle and pucker without forming creases of sufficient depth to damage the foam surface, and thereby is capable of conforming to the top surface of the foam over its entire area inspite of the variations in flow speed which occur. As the lower cover layer is separate to the upper layer, it is able to slide with respect to it in order to maintain its conformity with the foam surface. In other words, the lower layer is able to follow the movements of the underlying foam and does not impose any significant forces resisting such movements which would cause the surface to break up so that cracks are formed. The upper cover layer, being of relatively stiff material compared with the lower layer and conveniently made of paper, facilitates the handling and control of the flimsy lower layer and, as explained below, it can ensure a smooth continuous surface for sliding contact with means arranged to rest on the foam and covering layers to assist in ensuring a flat top surface to the foam bun produced.

In GB 1392859 (Hennecke) it is suggested in connection with the particular process described therein to use two cover layers, in particular a lower gas permeable layer, such as a porous or perforated paper web, and an upper liquid impermeable layer. It is explained that the lower layer allows escape of gases released from the foaming mixture and the upper layer prevents any foaming mixture which penetrates the lower layer from contaminating the levelling device which is arranged to press down on the foaming mixture through the cover layers to flatten the upper surface. It should be explained that this proposal is based on a false premise that it is desirable to allow gases to escape freely. In present day plants constructed to manufacture slabstock foam in accordance with the Hennecke process, the foam is covered with a single laminated sheet which is gas and liquid impermeable. The laminated sheet used is as described in U.S. Pat. No. 4,492,664 and consists of a polyethylene foil which is bonded to a web of Kraft paper, the bond between the laminations being weak enough to allow the paper web to be peeled away and removed when the foam expansion has been completed.

As GB 1487848 (Planiblock) acknowledges, it is actually beneficial to prevent gases escaping while the foam is expanding, and in line with this teaching, it specifies use of a single cover sheet of gas impermeable material, as is used in the practical application of the Hennecke process.

When a double layer cover is placed over the foaming mixture in accordance with the process of the present invention, smooth top skin is produced and the weight of the skin scrap at the top surface is substantially reduced, e.g., by about 50% compared with that produced in operation of the conventional Maxfoam process without a top cover applied over the foaming mixture. Because the skin is thinner, more of the raw material used is transformed into foam, i.e. a greater material conversion is achieved, and a significant material saving is possible. The thinner skin also improves the appearance of the block, making it more acceptable to customers, and ensures that the top layers can be sold for processing into rebonded granulated foam, even when the thin plastics cover film is included with these layers, which further enhances the economy of the process.

There are some additional advantages which accrue directly from the provision of the cover sheets. As the material of the cover layers is impermeable to the gases, the loss of gases during the foam expansion phase is reduced. The uncontrolled emission of gases into the atmosphere is undesirable because of the hazards to personnel working in the plant and/or to the environment. Any escape of gas is confined to the lateral edges and can be dealt with satisfactorily by appropriately located extraction equipment. In the manufacture of polyurethane foam it is common to include in the reaction mixture a secondary blowing agent, i.e., a liquid which vapourises to supplement the gas given off in the chemical reaction. Chlorofluorocarbons (CFC's) are frequently used for these purposes. By reducing the loss of gases at the top surface, the amount of secondary blow agent can be reduced. One of the reactants generally used in polyurethane foam production is toluene diisocyanate (TDI), which tends to react with atmospheric moisture and cause decreased hardness in the uppermost layers of the foam. By applying the cover layers over the foam, exposure to atmospheric moisture is minimised and more uniform hardness is attained over the height of the block. Thus, the hardness characteristic is improved, or alternatively the amount of TDI used can be reduced while the same hardness characteristic is achieved.

Although the two cover layers must be separate so that they can slide relative to each other to allow the lower plastics film to follow local surface movements of the foam, they can conveniently be applied together, e.g., by training them around a common roller located in the region of the overflow outlet from the vessel. For ease of handling it is especially convenient to use for the cover layers initially laminated sheets which are commercially available and already in use in foam manufacturing processes. However, in contrast to the normal use of the laminated sheets, the polyethylene film layer must be delaminated from the web of Kraft paper before being brought into contact with the foam mixture. Once separated there is no tendency for the polyethylene and paper foils to adhere together again. The delamination can be achieved in a simple way, such as by unreeling the laminated sheet from a roll and directing the two layers around respective, spaced guide rollers, after which the layers are brought back together and guided into contact with the foaming mixture. It has been found appropriate to bring the cover layers into contact with the foam close to the outlet edge of the vessel, and most ideally on the upstream side of this edge so that the cover layers are actually brought into contact with the mixture in the vessel.

As mentioned above, the conventional Maxfoam process, in which no top cover is applied, produces foam blocks with substantially flat top surfaces. If the foam is of low density, however, the blocks tend to form bulges on their upper surfaces adjacent the lateral edges. When dual cover layers are applied over the foam according to the invention, a light downward pressure exerted onto the foam through the cover layers can assist in obtaining an even flatter top surface.

Thus, in accordance with a preferred embodiment of the present invention there is provided a process for the production of slabstock polymeric foam wherein foam reactants are fed to a vessel, the reacting foam mixture passes from the vessel over an overflow outlet and to a channel shaped conveyor, there being a downwardly inclined surface extending from the overflow outlet in the foam conveying direction so that the foaming mixture expands downwardly as it progresses along the surface, applying a covering to the upper surface of the foam mixture in the region of the overflow outlet, the covering comprising a lower layer of flaccid plastics film material and a separate upper layer of stiffer material, and applying levelling means to act downwardly on the covering and foaming mixture to level the upper surface of the foam transverse to the direction of foam travel, the means being capable of free vertical movement to follow the foam surface.

The downward pressure which is applied to the foam mixture by the levelling means to help ensure the substantially horizontal top surface is relatively light. The application of this low downward pressure does not detract from the foam quality because any tendency to increase the foam density in the uppermost layers is counteracted by the reduction in density obtained due to the covering layers being present.

The invention also resides in an apparatus for manufacturing slabstock polymeric foam by the method of the invention, comprising a vessel with an overflow outlet, a downwardly inclined fall plate extending from the vessel, means for supplying separate upper and lower cover layers to the upper surface of the foaming mixture including means for guiding the lower cover layer into contact with the foam mixture in the region of the overflow outlet, and means for acting downwardly on the expanding foam through the cover layers to level the foam surface in the direction parallel to the overflow outlet.

Especially good results have been achieved by use of a blanket or blind anchored at its upstream end and arranged to cover substantially the whole area of the expanding foam. The blanket is preferably constructed to be highly flexible in the longitudinal direction to enable it to conform to the rising profile of the foam mixture during the expansion stage, and to be relatively stiff in the lateral direction for maintaining the upper cover layer and hence the top surface of the expanding foam level, i.e., horizontal in the lateral direction. A suitable construction for the blanket is that of a rush mat with all the elongate elements or reeds parallel to each other and secured together by threads. Of course a blanket with the desirable longitudinal flexibility and lateral stiffness can be made in other ways. The upstream end of the blanket can be anchored by a member such as a roller to which it is secured and onto which the blanket can be rolled up when not in use.

The blanket also serves to maintain the cover layers on the foam to prevent them being blown away from the foam surface at blow-off, i.e., at completion of the foam expansion when the cells open and gases escape from the foam surface. For this reason the blanket preferably extends beyond the point of full rise and blow-off of the foam.

The upper cover layer, preferably paper as mentioned above, although it may comprise other material such as plastics, e.g., a sheet of closed cell foam, ensures a low running friction between the advancing foam and the stationary blanket. Therefore, the blanket does not resist the forward advancement of the foam or in any sense impair the continuity of the top surface of the foam. To increase and facilitate control of the downward pressure exerted on the expanding foam, transversely extending plates can be placed on the blanket and additional weights can be located on the plates if required. The plates are preferably free of any further support or guidance so that the weighting system of the blanket and weighted plates is free of friction, which eases control over the process as external forces influencing vertical movement of the blanket and weighted plates are eliminated.

It is convenient to provide a guide roller to bring the cover layers into contact with the foam mixture surface, and in order to enable this to be effected at the optimum location, it is preferable that the position of the roller be adjustable both vertically and to-and-fro with respect to the overflow outlet of the vessel.

BRIEF DESCRIPTION OF THE INVENTION

To facilitate a clear understanding of the invention a specific embodiment will now be described in greater detail with reference to the accompanying drawings in which:

FIG. 4 is a schematic cross-section through a sheet take-off mechanism included in the apparatus of FIG. 1.

DETAILED DESCRIPTION OF THE PREFERRED EMBODIMENT

Figure 1:
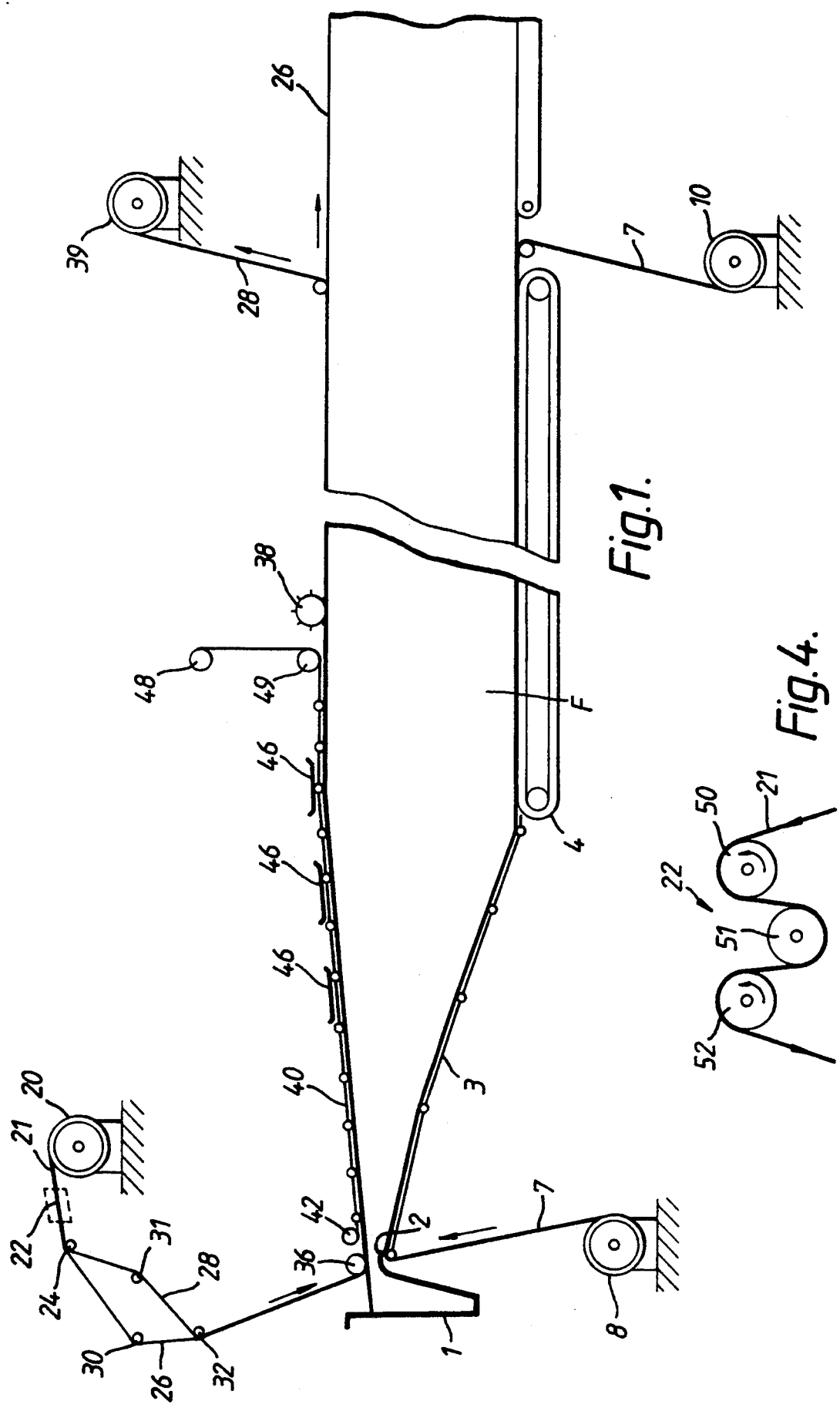
FIG. 1 is a schematic longitudinal cross section through an apparatus for producing slabstock polyurethane foam in accordance with the method of the invention.
Figure 2:
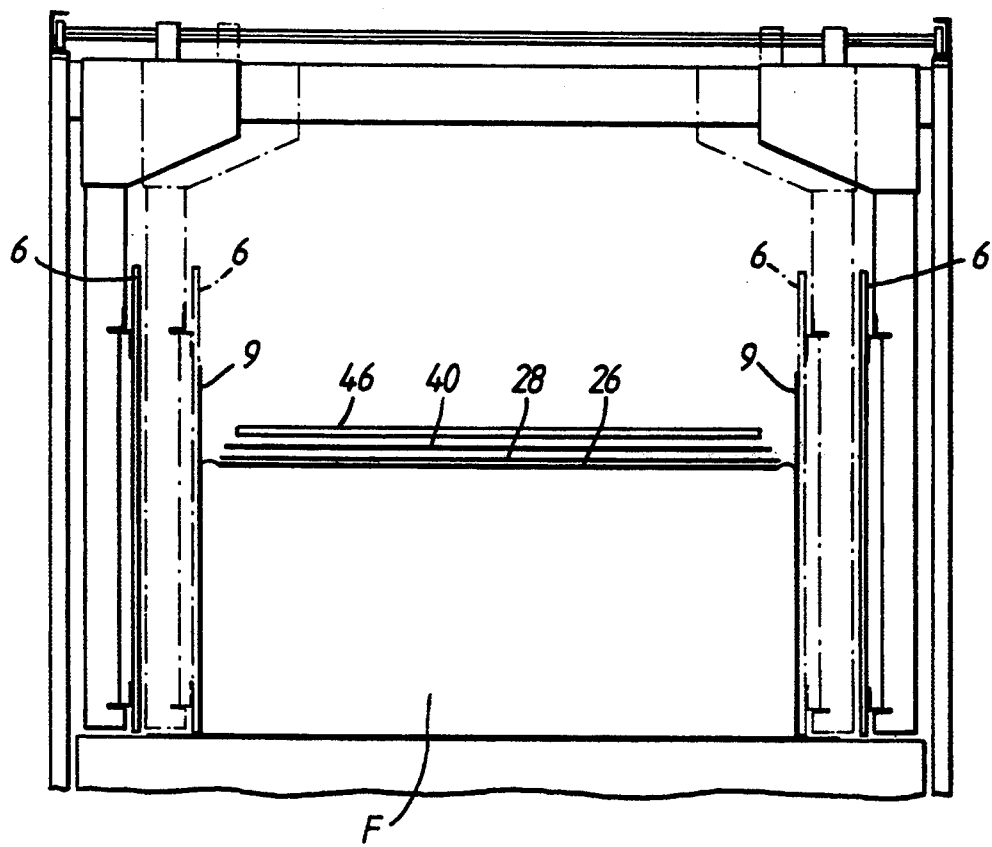
FIG. 2 is a vertical section through the apparatus of FIG. 1.
Figure 3:
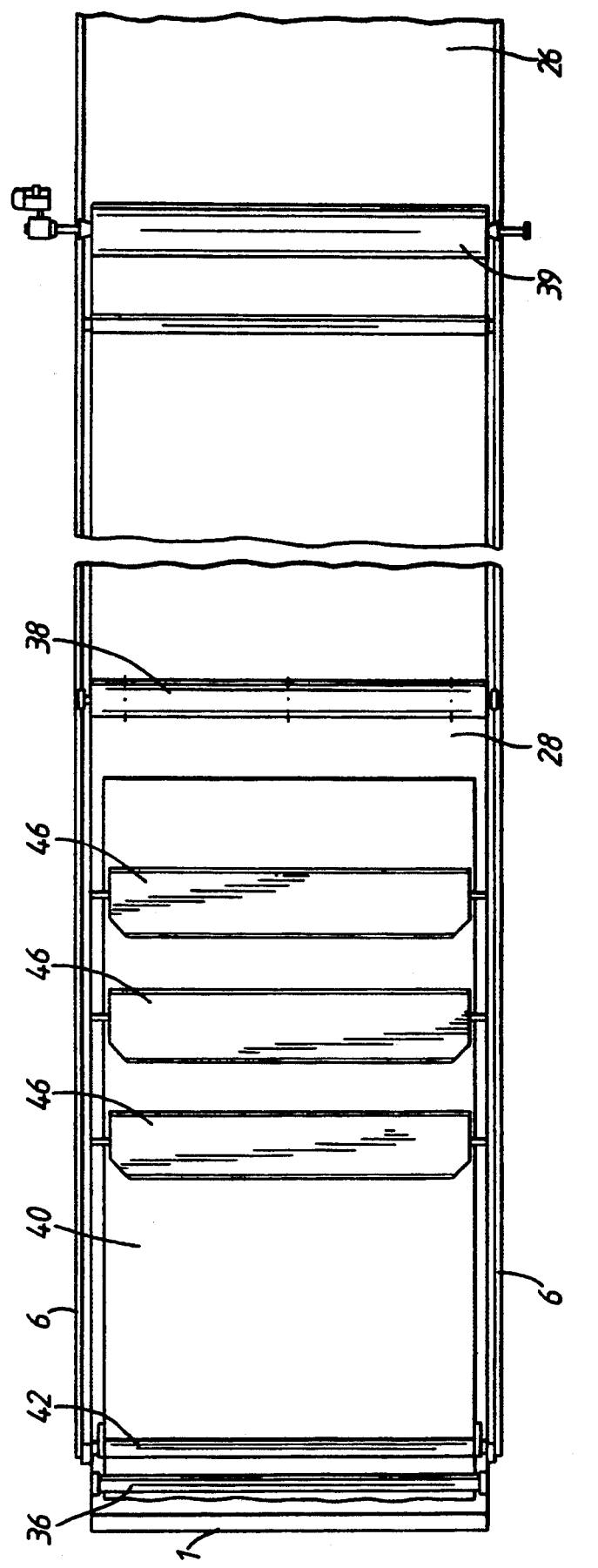
FIG. 3 is a plan view of the apparatus of FIG. 1.

Referring initially to FIGS. 1-3, there is illustrated an apparatus including a vessel 1 into the bottom of which the chemical reactants for producing polyurethane foam are delivered from a suitable mixing head (not shown). The vessel has an overflow outlet defined by an out-turned lip 2 at its upper forward edge. A fall plate 3 extends in a downwardly inclined position from the lip 2, and terminates at the upstream end of a conveyor 4. The fall plate is made up of sections which are hinged together and in known manner are adjustable with respect to each other to vary the inclination of the respective sections. Vertical side walls 6 are positioned on either side of the fall plate and the conveyor and together therewith define an open topped channel of rectangular cross section for shaping the foam slab being produced. A bottom lining paper 7 is fed from a supply 8 and guided between the lip 2 and the fall plate 3 for covering the bottom of the channel. Similarly, side wall lining papers 9 (FIG. 2) are fed from respective supplies (not shown) and are guided to cover the inner faces of the respective side walls 6 of the channel. In a manner well known per se the lining papers 7, 9 are advanced along the channel with the foam F during the foam production process to avoid the foam sticking to the surfaces of the moulding channel. At a position downstream of the conveyor 4 where the foam has cured, the bottom paper 7 is removed and wound onto a reel 10, and the side papers are also removed and wound onto reels (not shown).

As described so far, the apparatus is as employed in the known Maxfoam foam production process. In accordance with the present invention equipment is provided for applying two cover layers over the top surface of the reacting foam mixture near the overflow outlet of the vessel 1. The two cover layers could be fed from respective supplies, but it is preferred, and as illustrated in the drawings, the two cover layers are provided by a single roll 20 of composite sheet material 21 consisting of a thin film of polyethylene film laminated to a web of Kraft paper. Sheet material of this composition is available on the market. The two layers of the composite sheet are bonded only lightly together and can easily be delaminated, after which the layers no longer adhere to each other and they will readily slide and move relative to each other. The sheet material is unwound from the roll 20 by a take-off mechanism 22, described in more detail below, which is adapted to control the feed rate to match the speed of the reacting foam leaving the vessel I so that the cover layers do not impede the advance of the foam. After the take-off mechanism the composite sheet 21 is passed around a guide roll 24, following which the two layers 26, 28 of the sheet are peeled apart by passing them around respective spaced rollers 30, 31 having parallel axes. The separate, delaminated sheets are then brought together again at a further guide roller 32 to be delivered onto the surface of the reacting foam. The cover layer supply system is configured so that the thin polyethylene film 26 is delivered onto the foam beneath the paper layer 28.

The cover layers 26, 28 are guided onto the surface of the reacting foam mixture by a guide roller 36 located over the vessel 1 adjacent the overflow outlet. This roller 36 is adjustable vertically, and backwards and forwards to optimise the position at which the cover layers 26, 28 are brought into contact with the reacting foam, and in this respect it is important to ensure that air is precluded from entering under the cover layers. Tests have shown a most satisfactory location for the guide roller 36 to be close to the vessel 1, i.e., a small distance downstream of the outlet lip 2. After passing around the roller 36, the cover layers are free to float on the foam surface over the expansion zone, as may be clearly seen in FIG. 1.

The lower, polyethylene cover layer 26 is a flimsy film which by crumpling and wrinkling is able to follow and conform to local surface movements of the reacting foam. The ability of the film to crease is not restrained by the paper web due to the low friction between the cover layers. The relative stiffness of the paper web ensures it does not itself crease. By virtue of the two separate cover layers being able to slide freely with respect to each other the speed variations across the width of the foam do not mean the paper gets creased. The creases which are formed in the plastics film itself have little if any effect on the integrity of the foam surface and the surface of the foam is substantially smooth and totally devoid of deep splits and crevices.

At a position downstream of the foam expansion zone, i.e., when the foam has reached a maximum height and starts to cure, a spiked guide roller 38 is arranged to act on the cover layers. The purpose of the spiked roller is merely to keep the paper web 28 moving along a straight path and hold it against displacement due to the vibrations normally experienced in the operation of foam manufacturing machinery.

At the end of the conveyor, the upper cover layer, i.e., the paper web 28, is removed and wound onto a reel 39. The paper can be re-used, or may be utilised for other purposes, such as packaging. The polyethylene film 26 remains attached to the foam and is sliced away with the top skin layer when the foam is cut into blocks. The polyethylene film does not prevent the top skin layer being recycled by granulating and rebonding to produce certain foam products, by virtue of the reduced skin thickness, there is an overall improvement in the crumbed scrap foam produced for use in rebonding processes, and by a thick skin being replaced by a softer top layer, a lower density rebonded foam can be manufactured from the skin layers.

Over the foam expansion zone, there is provided a system for controlling the surface of the expanding foam and to help ensure that it remains level, that is horizontal in the direction perpendicular to the length of the channel along which the foam F progresses. The surface control system as shown comprises a blanket 40 attached at one end to a roller 42, the other end of the blanket being free so that the blanket trails behind the roller 42 under the effect of the movement of the foam and cover layers 26, 28, beneath it. The blanket is formed from elongate elements extending in the transverse direction and secured together so that the blanket has substantial flexibility in the longitudinal direction and is relatively stiff in the lateral direction, that is the direction along which the foam surface is to be maintained flat. The longitudinal flexibility allows the blanket to conform closely to the foam surface along the expansion zone. An additional benefit is that the blanket can be initially wound up on the roller 42 ready to be unwound and deployed over the foam as shown in FIG. 1 at commencement of a production run. A suitable construction for the blanket has been found to be a rush mat. The blanket may be 10–12 meters long and ideally has a width slightly less than the distance between the side walls 6 of the channel. (In FIG. 2 the side walls are shown to be adjustable between the position shown in broken line and that shown in full line to enable the width of the foam slab being produced to be adjusted, the typical block width being approximately 2 meters.) The roller 42 is adjustable vertically for arranging the leading or upstream end of the blanket at the appropriate height.

The downward pressure applied to the foam by the blanket 40 is very low and is increased by placing a number (3 as depicted in the drawings) of metal plates 46 on the blanket. These plates merely rest or float on the blanket and can therefore be located at any positions along the blanket, as deemed appropriate. In addition, weights (not shown) can be loaded onto the plates if desired to increase the pressure further. Thus, when manufacturing a high density foam, weights of about 1 Kg might be placed on at each end of the plates. The plates 46 extend substantially the full distance between the side walls 6, but they do not engage these walls. As neither the blanket nor the plates are supported or guided (apart from the blanket being attached to the roller 42), they are free to move vertically and the top surface control system is free of friction. Consequently, it is easy to set and regulate the pressure applied to the foam, which is not great and the blanket helps to spread the load applied by the weighted plates. The application of the gas-impermeable cover layers to the foam reaction mixture over the expansion zone has the advantage that only a thin top skin is formed on the foam. With more reaction material being turned into foam, a saving in materials, e.g., 1.5 to 2.5%, can be made.

The take-off mechanism 22 which unwinds the composite sheet 21 from the supply roll and ensures the cover layers 26, 28 are supplied to the foam in substantially tension-free condition is illustrated in a little more detail in FIG. 4. It includes three or more parallel rollers 50, 51, 52, the axis of the second roller 51 being offset from the plane containing the axes of the first and third rollers 50, 52, and the sheet 21 being trained around the rollers in turn as shown. The rollers 50, 52 are driven at the same speed, but the intermediate roller 51 is not driven and is an idler roller. When the sheet 21 is loose and not under tension, the rollers 51, 53 slip relative to the sheet and do not impart any substantial conveying force on the sheet. When the sheet 21 comes under tension, the idler roller 51 ensures the sheet is pressed against the driven rollers 50, 52, and the increased friction between the sheet and rollers causes the sheet to be advanced until the tension is relieved and the rollers start to slip again. By virtue of this mechanism 22, the delivery of the cover layers 26, 28 to the foam is easily controlled so that they can immediately move along with the foam at the same speed.

At the termination of a production run the blanket could be rewound onto the roller 42, but for convenience in facilitating the positioning of a back board behind the trailing end of the foam block it is preferred to provide an additional take up roller (48) for winding up the blanket at the end of a production run. For this purpose the trailing or downstream end of the blanket is lead around a guide roller 49 and connected to the take up roller 48 while the other end is released from the roller 42, and the take up roller is rotated to wind up the blanket at such a speed that the leading end of the blanket follows the rear end of foam as it passes along the channel.

We claim:

1. In a process for the production of slabstock polymeric foam product comprising supplying a reactant mixture for forming the slabstock polymeric foam product to a vessel having an overflow outlet, allowing the reactant mixture to begin reacting in said vessel, passing the reacting mixture over said overflow outlet onto a downwardly-inclined surface and into a channel-shaped conveyor, the reacting mixture forming a foam product having an upper skin with a generally flat top surface, the improvement including the step of applying upper and lower sheets to an upper surface of the reacting mixture adjacent said overflow outlet so as to reduce a thickness of the upper skin formed in the foam product, said lower sheet being in contact with the upper surface of the reacting mixture and composed of a flaccid material for conforming to said upper surface, said upper sheet being composed of a relatively stiff foil material, said upper and lower sheets being separate and freely movable relative to one another when applied to the upper surface of the reacting mixture.

2. A process according to claim 1, wherein the upper sheet is a paper foil.

3. A process according to claim 1, wherein the upper and lower sheets are applied to the upper surface of the reacting mixture by training said sheets around a roller located in close proximity to the overflow outlet.

4. A process according to claim 1, wherein the upper and lower sheets are delivered from a supply of laminated sheets and said sheets are delaminated prior to their application to the upper surface of the reacting mixture.

5. A process according to claim 1, wherein relatively light downward pressure is applied onto the upper and lower sheets to level the upper surface of the reacting mixture transverse to the direction of foam travel.

6. A process according to claim 5, wherein the downward pressure is applied by means resting on the upper and lower sheets and arranged to extend over substantially the entire area of the upper surface of the reacting mixture during expansion of the reacting mixture.

* * * * *